(12) United States Patent
Smith

(10) Patent No.: US 8,646,339 B2
(45) Date of Patent: Feb. 11, 2014

(54) THREAD CLAMPING DEVICE INCLUDING INTERNAL SENSING AND REPORTING

(76) Inventor: Ronald A. Smith, Los Gatos, CA (US)

( * ) Notice: Subject to any disclaimer, the term of this patent is extended or adjusted under 35 U.S.C. 154(b) by 0 days.

(21) Appl. No.: 13/385,178

(22) Filed: Feb. 6, 2012

(65) Prior Publication Data

US 2012/0198941 A1 Aug. 9, 2012

Related U.S. Application Data

(60) Provisional application No. 61/462,707, filed on Feb. 7, 2011.

(51) Int. Cl.
*G01L 1/22* (2006.01)
*F16B 39/36* (2006.01)
*F16B 37/08* (2006.01)

(52) U.S. Cl.
USPC ....... 73/862.338; 411/267; 411/265; 411/433

(58) Field of Classification Search
USPC ................ 411/427, 432, 434, 436, 437, 438; 73/862.338, 761; 81/479
See application file for complete search history.

(56) References Cited

U.S. PATENT DOCUMENTS

| | | | | |
|---|---|---|---|---|
| 2,896,496 A * | 7/1959 | Jansen | | 411/347 |
| 3,695,139 A * | 10/1972 | Howe | | 411/432 |
| 3,797,336 A * | 3/1974 | Howe | | 81/125 |
| 4,246,780 A * | 1/1981 | Reed | | 73/862.49 |
| 4,886,113 A * | 12/1989 | Ross et al. | | 166/51 |
| 5,347,871 A * | 9/1994 | D'Andrea et al. | | 73/775 |
| 5,733,084 A * | 3/1998 | Fullerton | | 411/267 |
| 6,712,574 B1 * | 3/2004 | Roopnarine | | 411/433 |
| 7,350,420 B2 * | 4/2008 | Burmann | | 73/761 |
| 7,690,868 B2 * | 4/2010 | Wallstein et al. | | 405/302.2 |
| 7,752,824 B2 * | 7/2010 | Brown et al. | | 52/745.21 |
| 8,142,127 B1 * | 3/2012 | Doyle et al. | | 411/433 |
| 2006/0225511 A1 * | 10/2006 | Burmann | | 73/761 |
| 2007/0286702 A1 * | 12/2007 | Smith | | 411/432 |
| 2008/0115636 A1 * | 5/2008 | DeRose et al. | | 81/479 |
| 2010/0033965 A1 * | 2/2010 | Casey et al. | | 362/234 |
| 2010/0054891 A1 * | 3/2010 | Nishida et al. | | 411/9 |

* cited by examiner

*Primary Examiner* — Lisa Caputo
*Assistant Examiner* — Jonathan Dunlap
(74) *Attorney, Agent, or Firm* — George Wolken, Jr.

(57) ABSTRACT

The present device relates to a thread clamping device including a plurality of movable segments with threaded inner surfaces suitable for engaging a threaded rod and including a strain gauge therein for measuring the actual strain on the device, in contrast to conventional thread clamping devices restricted to measuring the torque applied during installation, not the actual strain experienced during service. In addition to measuring the actual strain experienced by the thread clamping device, some embodiments of the present invention also relate to a transmitter for transmitting to a remote receiving station the actual strain measured, typically including a suitable identification code for determining which device is transmitting.

4 Claims, 11 Drawing Sheets

THREAD CLAMPING DEVICE INCLUDING INTERNAL SENSING AND REPORTING

CROSS-REFERENCE TO RELATED APPLICATIONS

This application claims priority from provisional patent application Ser. No. 61/462,707 filed Feb. 7, 2011, the entire contents of which is incorporated herein by reference for all purposes.

BACKGROUND OF THE INVENTION

1. Field of Invention

This invention relates generally to the field of threaded fasteners or thread clamping devices, and more particularly to a thread clamping device capable of internally measuring the tension load on the device and capable of remotely reporting the measured load and a unique identification code electronically, typically employing RFID (Radio Frequency Identification) technology.

2. Description of the Prior Art

The fastener industry has several examples of threaded female fasteners with moving segments that facilitate quick connection or assembly of the fastener to a threaded rod when assembled in one direction (moved along the threaded rod), but locks when linear motion (without rotation) of the fastener along the threaded rod is attempted in the opposite direction. That is, the fastener can be moved along a threaded rod in one direction rapidly and without rotation (hereinafter the "ratcheting" direction), but locks when motion is attempted along the rod in the opposite direction (hereinafter the "locking" direction), requiring rotation of the fastener to move the fastener in the locking direction. Upon applying an external torque to tighten the fastener, the fastener will drive its segments tightly against the threaded rod (if the fastener base can rotate), but not move axially along the rod, thus providing locking friction between the segment threads and the rod threads.

However, existing fasteners generally lack the capability to measure the actual load on the fastener and then communicate the measured load value to a remote receiving station. {Note: It is normal procedure to communicate to the remote receiving station an identifier that specifies which fastener generated the transmitted data along with such data. This is to be understood in the following descriptions even though an explicit recitation of transmitted identifier may not be provided in all cases.} When received by a remote receiving station, such information would be useful for several purposes including ascertaining if the fastener is bearing the proper load, not so large as to threaten failure nor so small as to imply improper installation or some other defect in the utilization of the fasteners.

It is common for fasteners to be installed with a torque wrench capable of applying a known and specified amount of torque to the fastener during installation, but this does not directly determine the actual load on the fastener during service. In particular, information about changes in the actual load experienced by the fastener during its service life, whether arising from wear on this or another component part or another cause, is unknown. Thus, a need exists in the art for devices and procedures for the in-service determination and communication of the load being born by a thread clamping device in service on a threaded rod.

SUMMARY OF THE INVENTION

Accordingly and advantageously the present invention relates to a thread clamping device including a plurality of movable segments with threaded inner surfaces suitable for engaging a threaded rod and including a strain gauge therein for measuring the actual strain on the device.

In addition to measuring the actual strain experienced by the thread clamping device, some embodiments of the present invention also relate to a transmitter for transmitting to a remote receiving station the actual strain measured, typically including a suitable identification code for determining which device is transmitting.

These and other features and advantages of the present invention will be understood upon consideration of the following detailed description of the invention and the accompanying drawings.

BRIEF DESCRIPTION OF THE DRAWINGS

To facilitate understanding, identical reference numerals have been used, where possible, to designate identical elements that are common to the figures. The drawings herein are schematic, not to scale and the relative dimensions of various elements in the drawings are not to scale.

Some of the drawings depict threaded structures having internal threads, external threads or both. An artifact in the drawing program produces threads whose depiction in the figures may appear as lacking the true spiral structure of actual threads, although the thread profile is properly depicted. However, the threads are depicted herein for purposes of explaining various structures, embodiments and/or other features or uses in connection with the present invention, and the possible apparent absence of spirals in the depiction does not affect the various descriptions presented.

Figure 1:
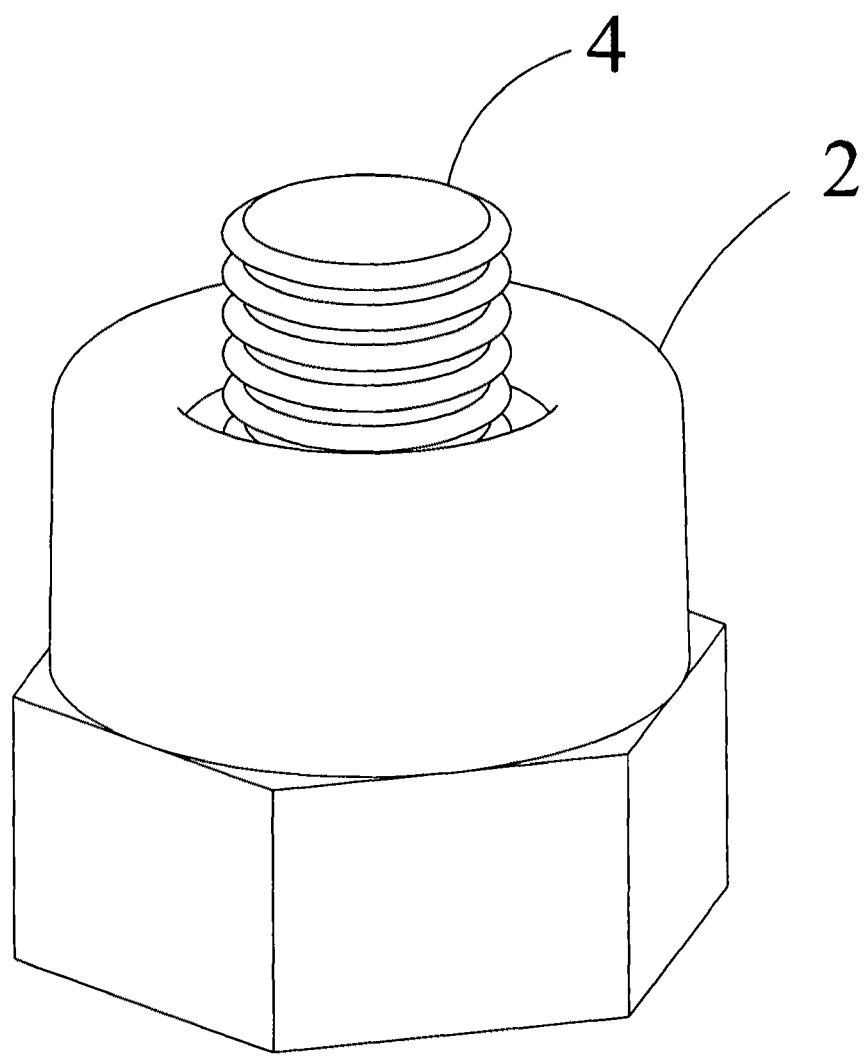

The techniques of the present invention can readily be understood by considering the following detailed description in conjunction with the accompanying drawings, in which:

FIG. 1 is a perspective view of a typical E-TCD engaged with a threaded rod.

Figure 2:
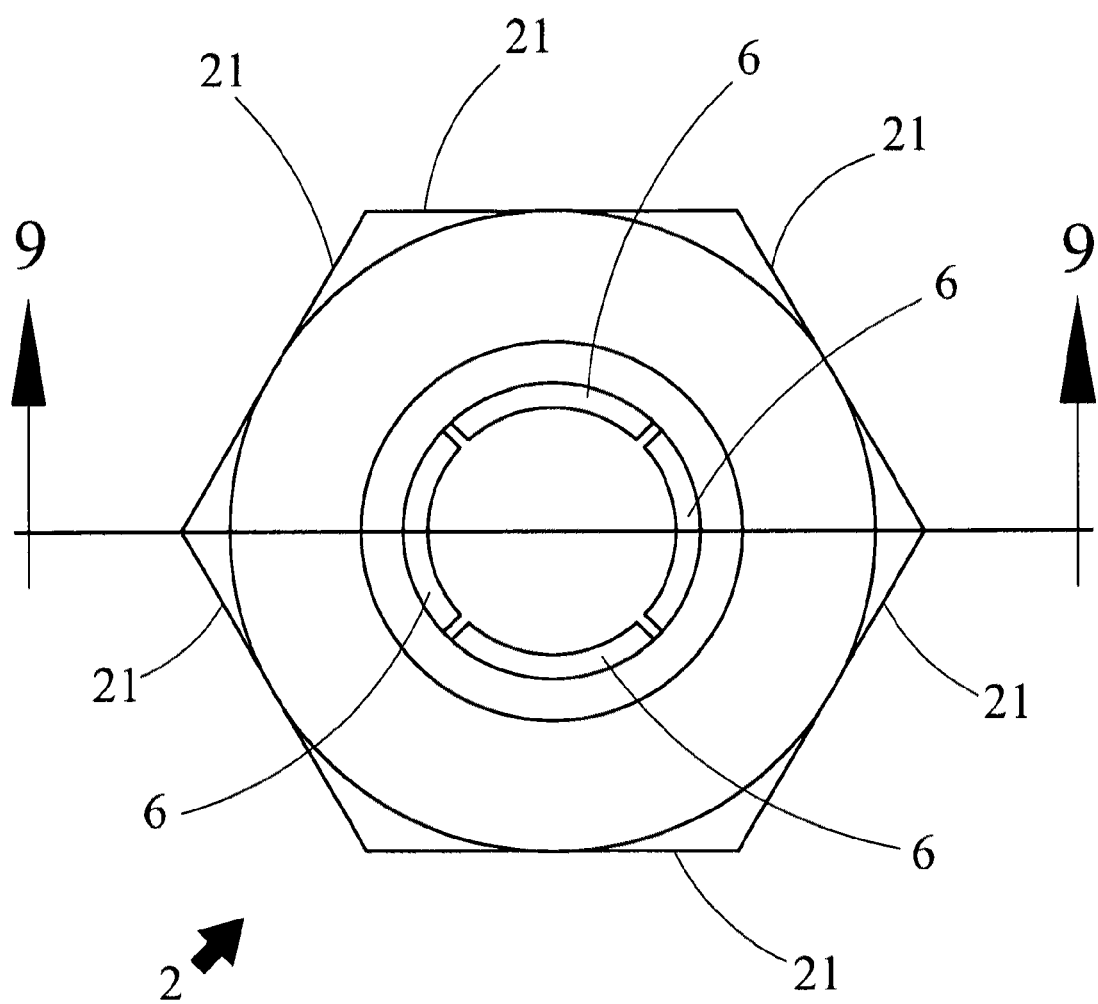

FIG. 2 is a top view of a typical E-TCD.

Figure 3:
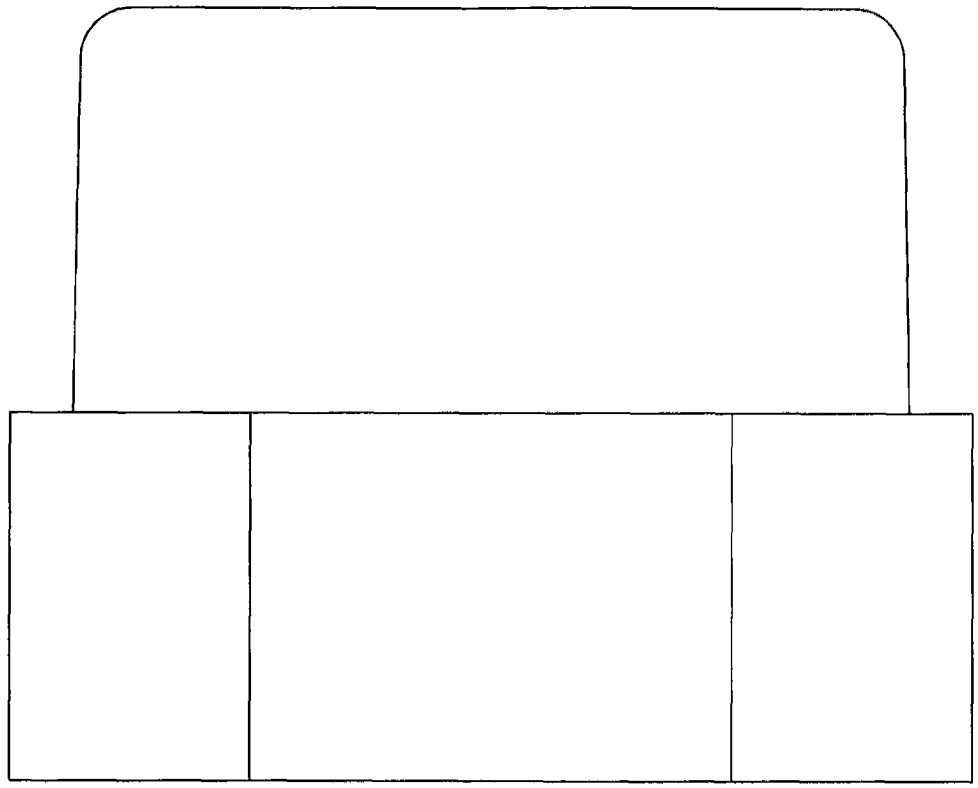

FIG. 3 is a side view of a typical E-TCD.

Figure 4:
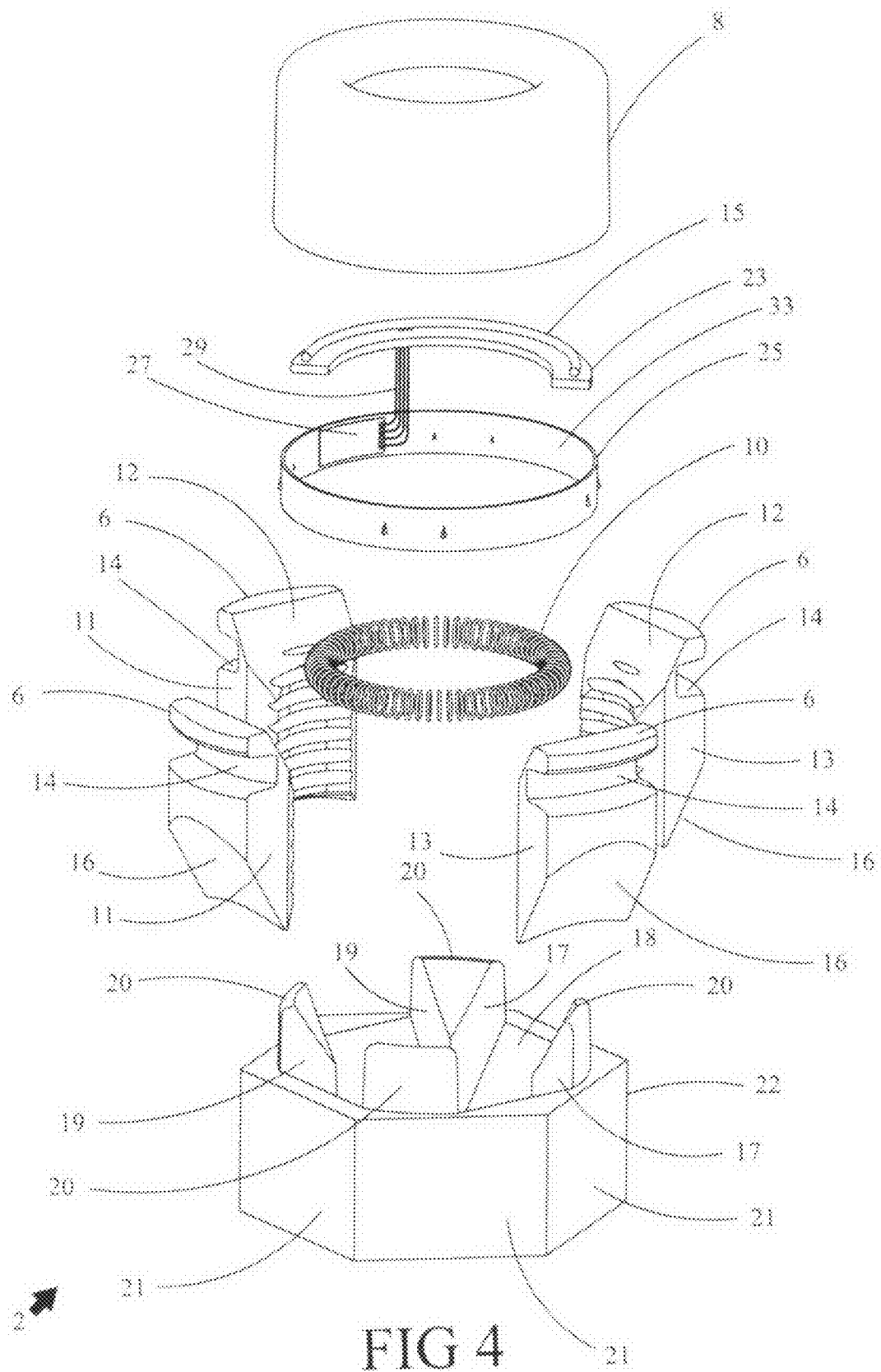

FIG. 4 is an exploded perspective view of a typical E-TCD.

Figure 5:
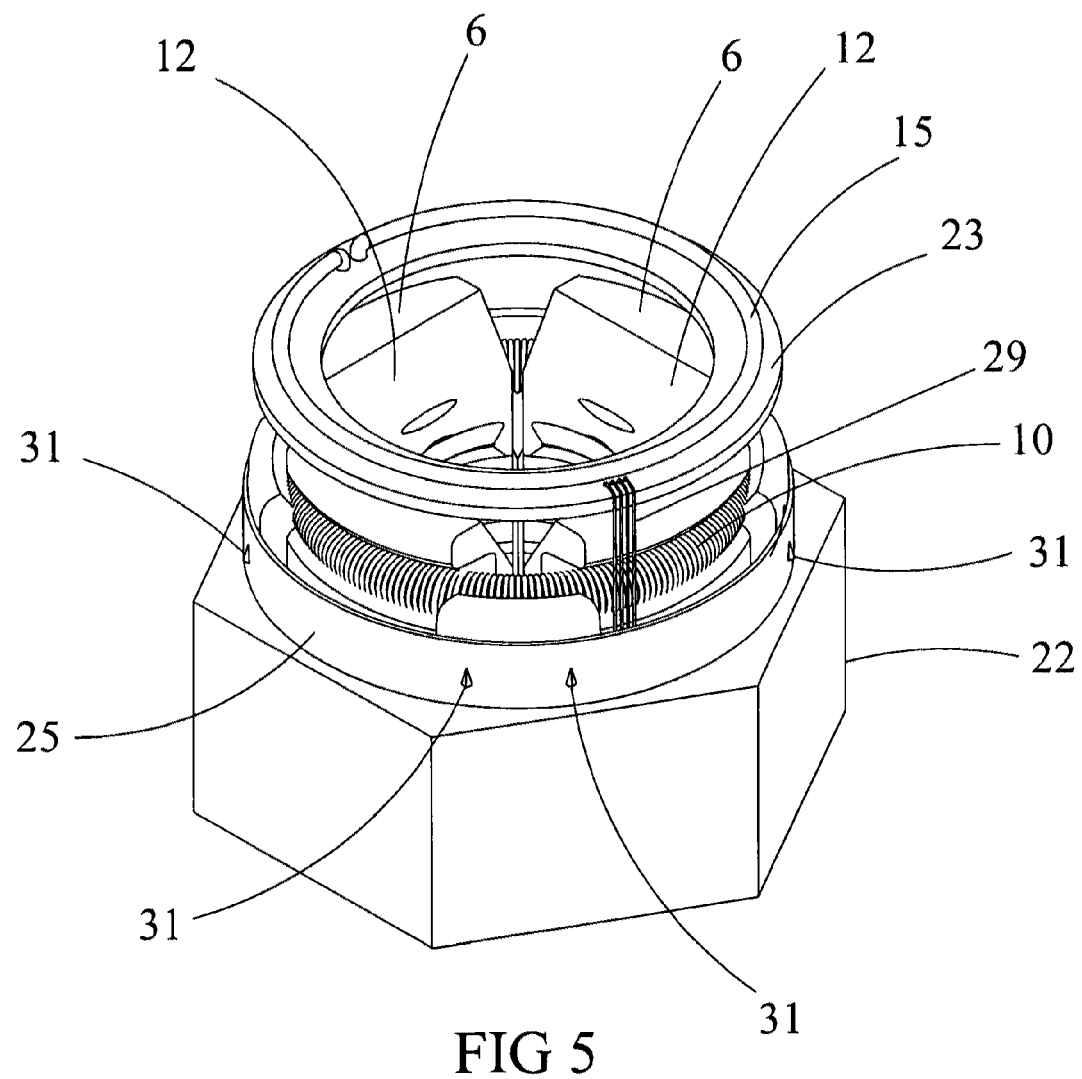

FIG. 5 is a perspective view of a typical E-TCD with the cap removed.

Figure 6:
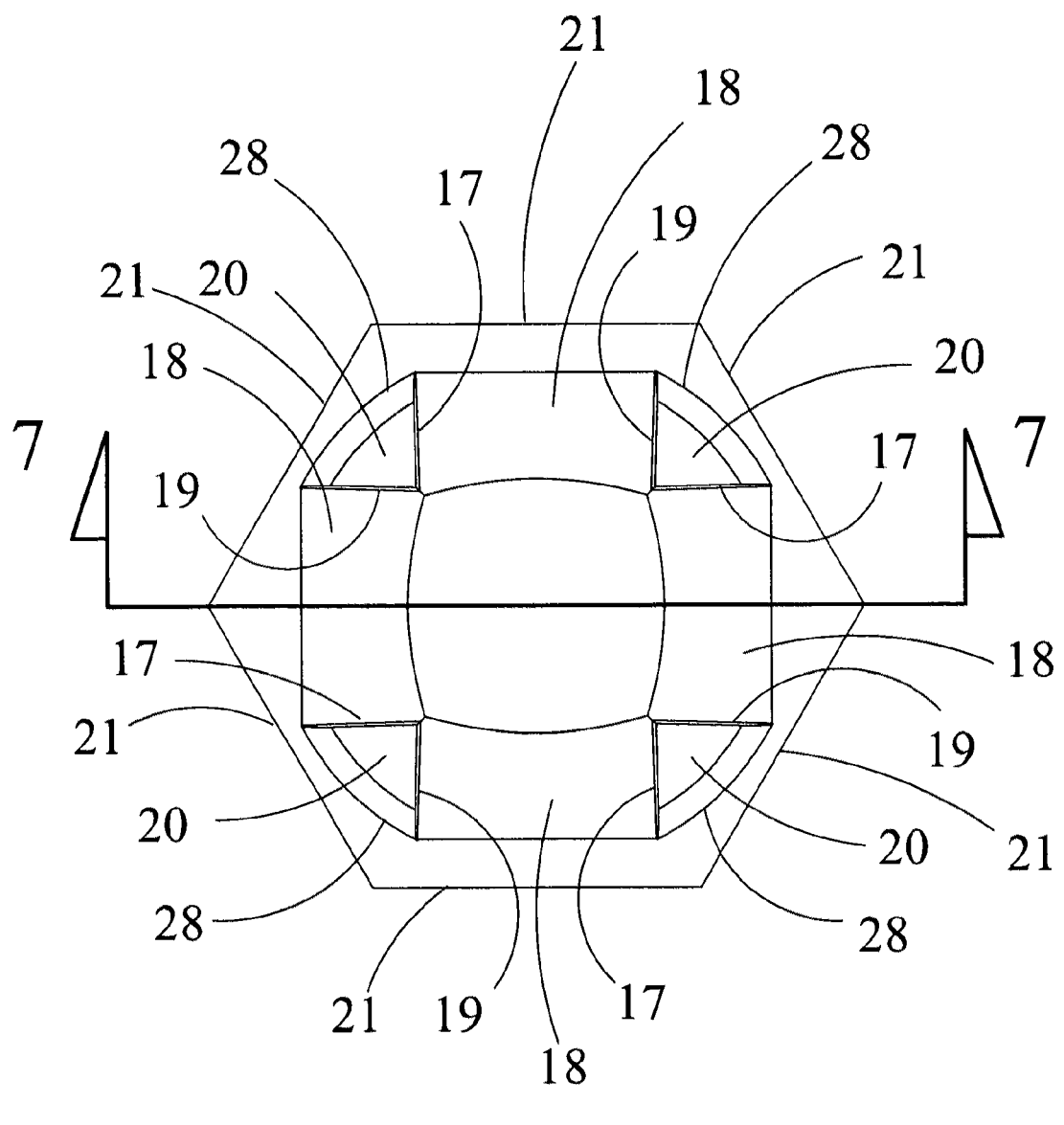

FIG. 6 is a top view of the base.

Figure 7:
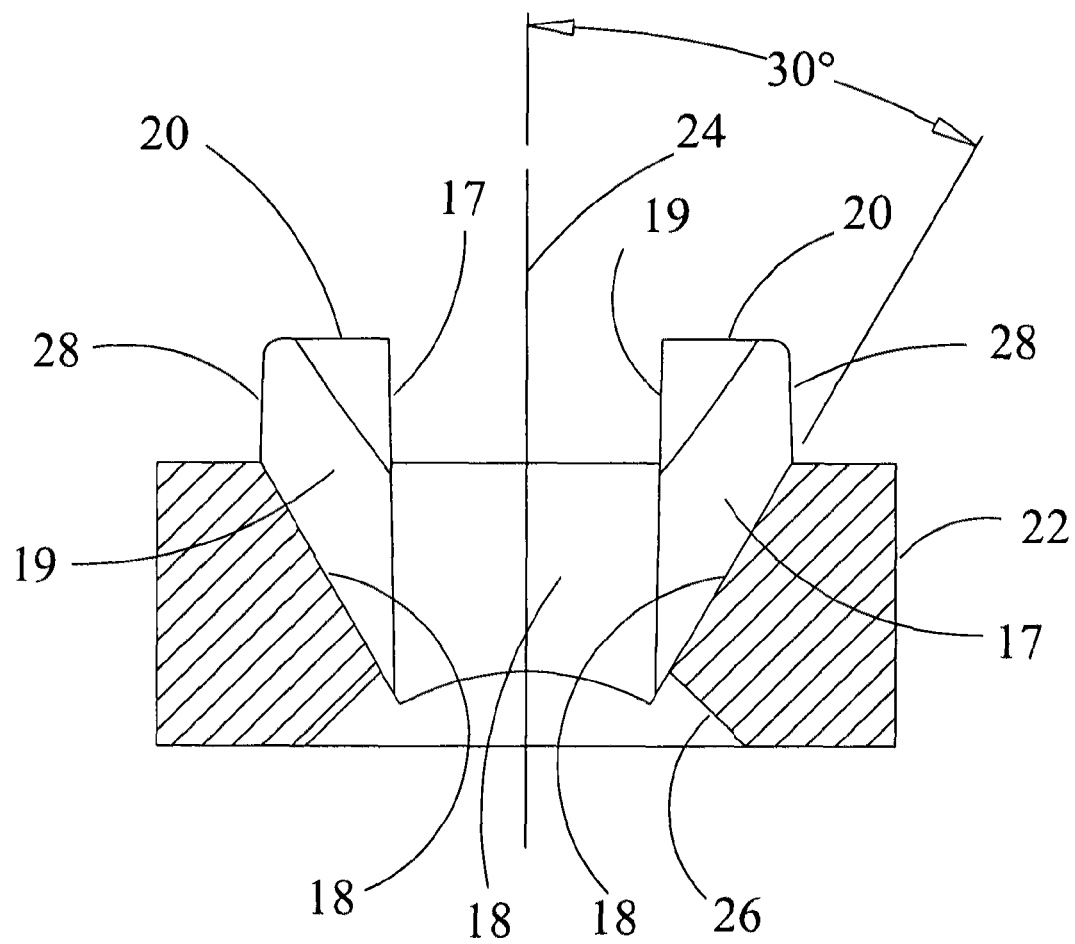

FIG. 7 is a cross section of the base taken along 7-7 of FIG. 6.

Figure 8:
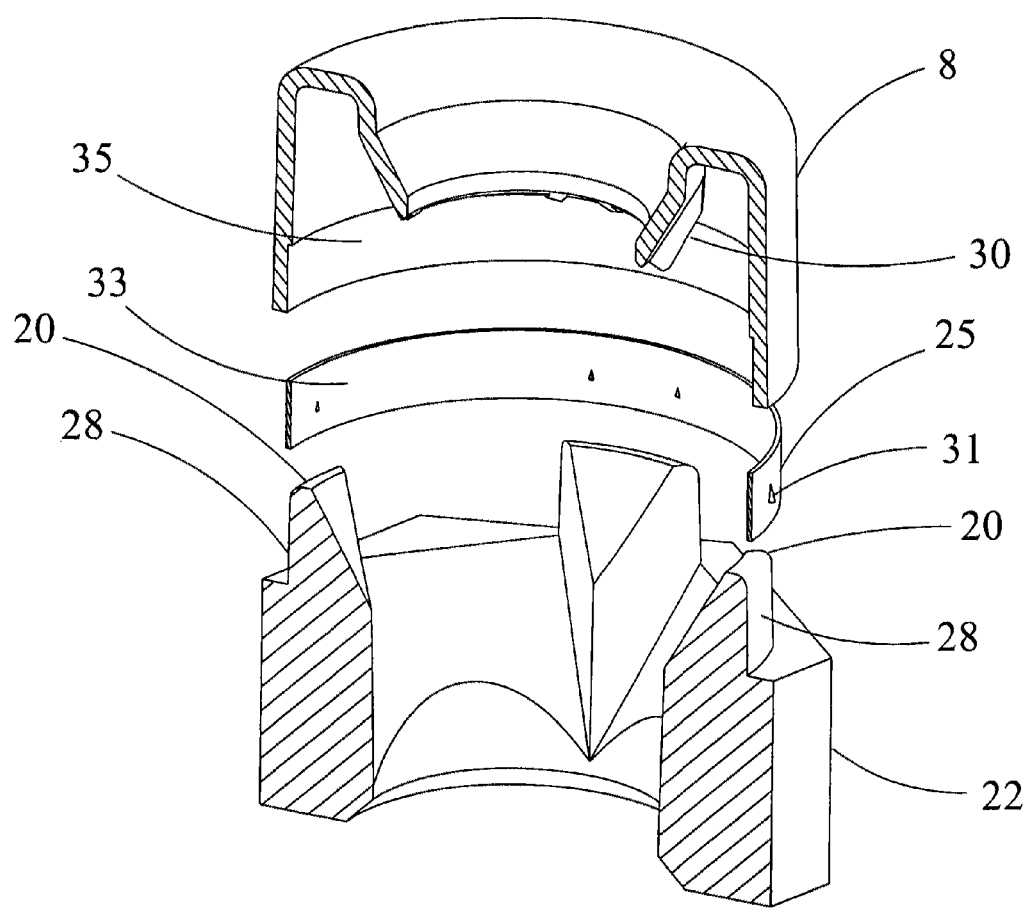

FIG. 8 is a perspective, sectioned view of the cap, strain ring and base.

Figure 9:
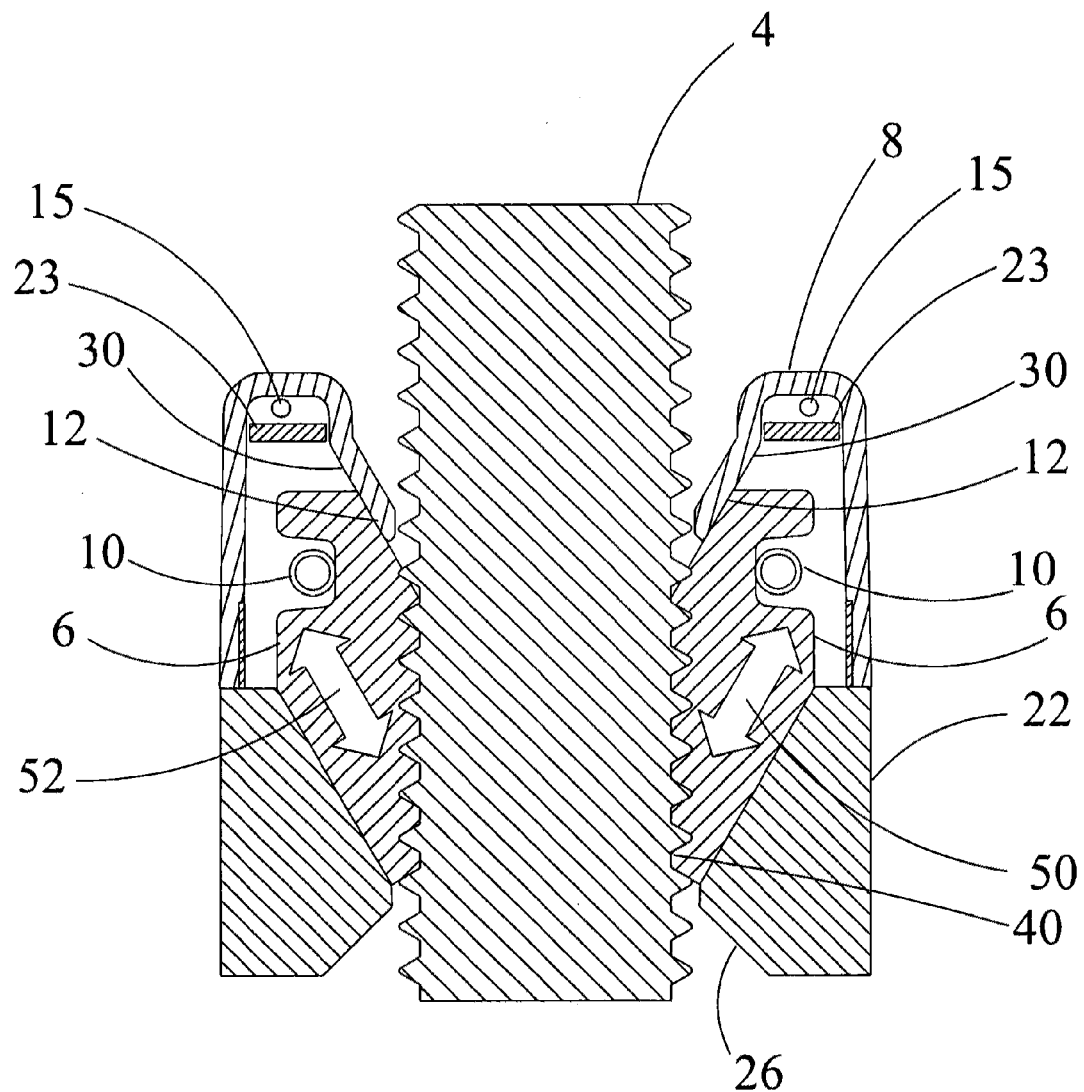

FIG. 9 is a cross section of rod, cap, segments and base taken along 9-9 of FIG. 2 with the addition of a threaded rod not shown in FIG. 2.

Figure 10:
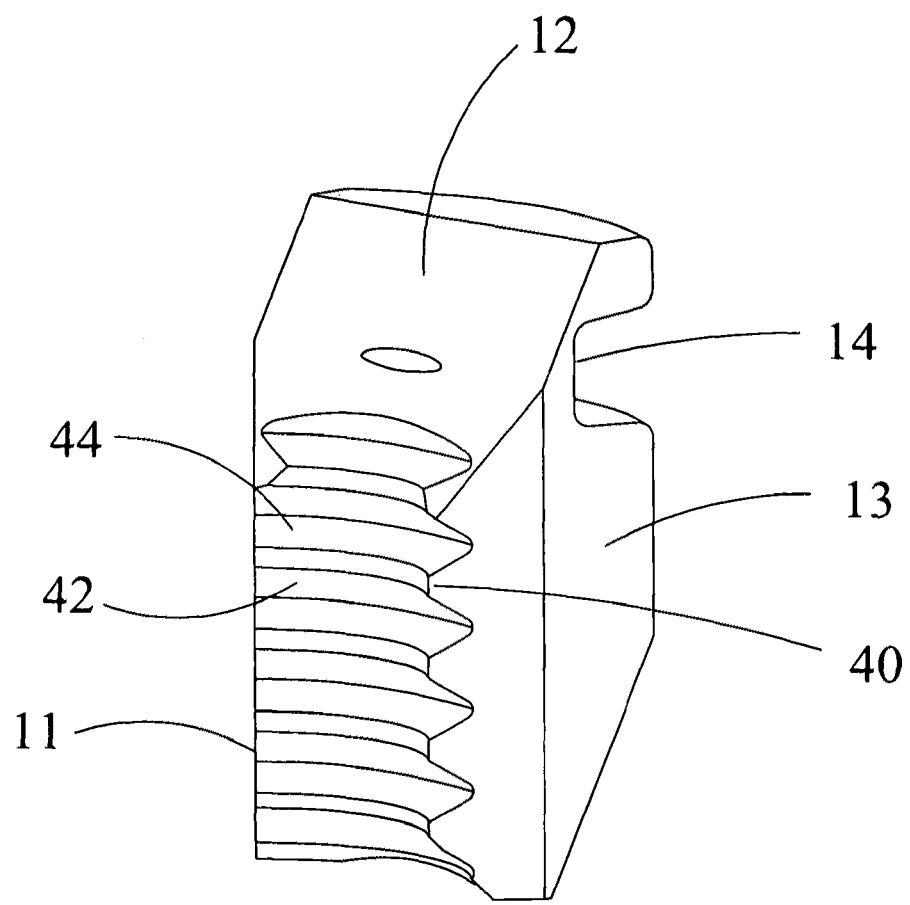
Figure 10:

FIG. 10 is a perspective view of a typical segment.

Figure 11:
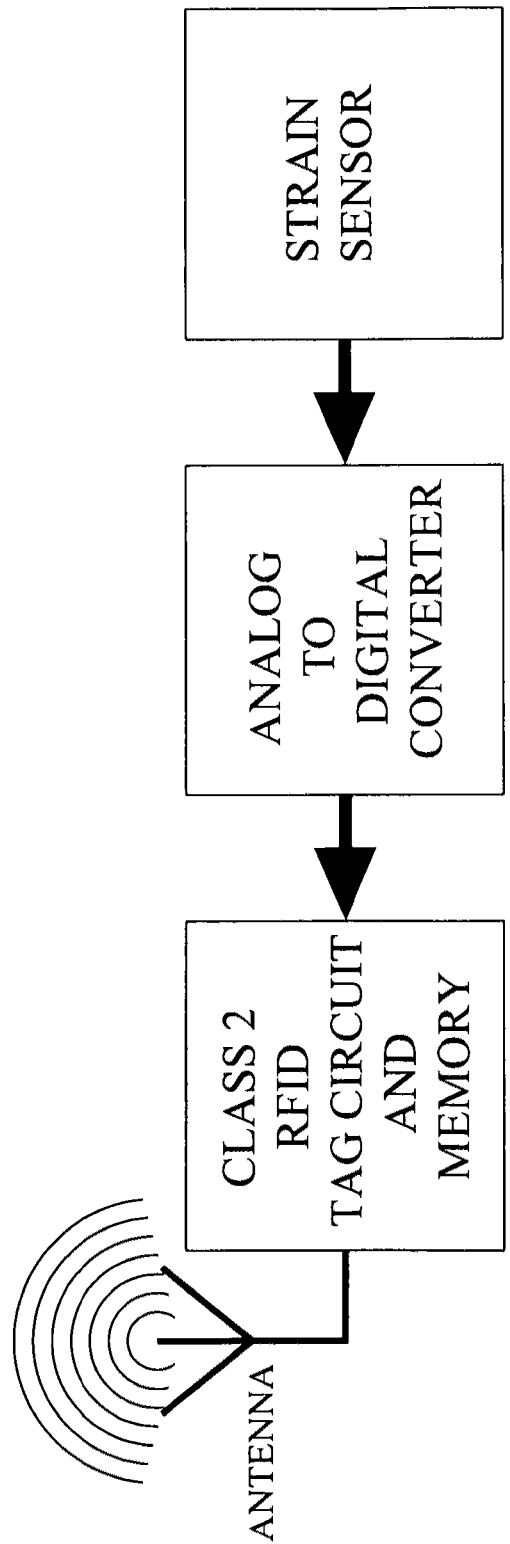

FIG. 11 is a block diagram of typical basic electrical functions including printed circuit board and strain gauge (strain sensor) circuitry.

DETAILED DESCRIPTION

After considering the following description, those skilled in the art will clearly realize that the teachings of the invention can be readily utilized in the determination and communication of loads born by a thread clamping device in service as attached to a threaded rod.

Prior approaches to the problem of ascertaining the actual load on a fastener while in use have typically used the measurement of torque on the fastener to infer the tension load on the fastener, and thereby provide information that the fastener is or is not within desired load limits for the particular nut/bolt connection. A common tool used to tighten a nut or bolt to a certain torque is referred to as a "torque" wrench. A conventional torque wrench provides information on the torque applied to the fastener, but does not directly provide information as to the load on the fastener achieved by the application of any particular torque. It is envisioned in some embodiments of the present invention that the thread clamping devices with electronic sensing pursuant to some embodiments of the present invention ("E-TCD") would make use of a specially modified torque-type wrench, a "load wrench", to perform the task of tightening fasteners but, rather than merely providing information about the applied torque, the load wrench, would include specially constructed on-board sensing and communication capabilities to communicate with sensors in the E-TCD and thus receive information on the actual fastener load. Such a load wrench is advantageously envisioned to be a typical tightening tool modified to communicate with the E-TCD, typically by means of the appropriate RFID protocol. That is, the load wrench would be one example of the "remote receiving station" with which the E-TCD communicates, although one or more additional remote receiving stations will typically be employed as well in connection with some embodiments of the present invention. Thus, the load wrench would typically have a visual display showing the actual load on the E-TCD, as communicated directly to the load wrench from the E-TCD as it is being tightened or loosened, allowing the user of the load wrench to observe the actual load on the fastener. Although sensing and communication capabilities as described herein can be employed in connection with many types of fasteners, it is envisioned that the fastener described in EP 1819930 and US 2007/0286702 A1 will be advantageous for this purpose. The E-TCDs pursuant to some embodiments of the present invention include the capability to measure directly the tension load on the fastener or the connecting threaded rod (the loads are the same) by measuring the deflection (or strain) internal to the E-TCD. This deflection or strain is directly proportional to the E-TCD tension load. Upon command this measured strain is translated into a digital word which may be transmitted to a remote receiving station such as an RFID reader after the RFID reader sends an interrogating signal to the E-TCD. It is envisioned that the tension load data and a code identifying the particular fastener can be supplied using conventional RFID technology, defined as a Class 2 RFID Tag operating with the appropriate RFID reader (interrogator), thereby providing mechanical data not otherwise available to the user through conventional RFID devices.

The E-TCD devices pursuant to some embodiments of the present invention thus provide the capability to communicate the E-TCD tension load and the E-TCD unique identification code remotely to the RFID reader-interrogator, and through other typical communication means (such as an internet connection) to virtually any other location.

In brief, the E-TCDs described herein engage the threads on a threaded rod (or simply "rod") by means of a number of threaded, movable segments wherein the threads of each segment are capable of robust engagement with the threads of a rod, typically different segments or groups of segments capable of binding with different thread structures.

The structure of threads on threaded rods may be defined according to profile geometry, diametral pitch, axial pitch and dimension among other characteristics. See for example, Machinery's Handbook, 28th Ed. (Industrial Press, 2008), pp. 1708-2026. The diameter of the rod also affects the geometry of the threads thereon. For economy of language, we use "thread type", "thread structure", "thread geometry" and the like to denote a particular thread configuration on a rod with a particular diameter.

The movable segments of the E-TCD may (but need not) have different thread structures capable of engaging corresponding thread structures on different types of rods. That is, each movable segment (or set of segments) of an E-TCD can be designed to meet the standards for a particular thread on a particular rod, allowing thereby a single E-TCD device to be suitable for use with more than one type of rod by including segments having different thread structures within a single E-TCD device. However, to be concrete in our discussions, we describe the case in which all segments have the same structure, not intending thereby to exclude E-TCDs containing different types of segments. Such E-TCD's with a single segment type are expected to be important in practice since the expense of manufacturing multiple segment types is avoided and the complications of assembling different segments types in the proper arrangement within a single E-TCD is likewise avoided.

In view of the foregoing, in accordance with the various embodiments of the present invention, there is provided a family of E-TCDs able to move along a threaded rod in one direction without rotation ("ratcheting direction" or "downward"), and further, will not move in the opposite direction without rotation ("locking direction" or "upward"). Each time the E-TCD moves (slides) at least a one half (½) thread downward (in the ratcheting direction) the E-TCD is configured to internally ratchet and lock in place, thus preventing the E-TCD from moving upward (in the locking direction) with respect to the threaded rod.

Additionally, an advantage of the E-TCD described herein over a traditional hex nut is that the E-TCD will typically be capable of successfully engaging threaded rods having damaged threads where even a substantial portion of the threads of the rod have been deformed to the point where the standard hex nut will jam. These and other features and advantages of the present invention will be understood upon consideration of the following detailed description of the invention and the accompanying drawings.

To be concrete in our discussion, we describe in detail the embodiment having four identical segments collecting data via a strain gauge and communicating with remote device(s) by means of RFID technology. Different numbers of segments, different types of segments and/or other modifications will be apparent to one having ordinary skill in the art, and are included within the scope of the present invention.

FIG. 1 is a perspective view of a typical E-TCD 2 engaged with a threaded rod 4 in accordance with some embodiments of the present invention. FIG. 2 and FIG. 3 show top view, and side view respectively of a typical E-TCD, 2.

FIG. 2 illustrates for this particular embodiment four segments 6, symmetrically positioned about the central axis of the E-TCD, 2. Also shown are hex surfaces 21. While the base 22 is shown with substantially hexagonal side surfaces, base 22 of the E-TCD 2 can also includes cubic, square and any other tubular configuration capable of accommodating threaded rod 4, and which is capable of including the components and features of the E-TCD 2, within the scope of the present invention.

FIG. 4 illustrates a complete E-TCD 2 with all parts exploded. All the parts illustrated in FIG. 4, when assembled, comprise a complete E-TCD 2 as would be employed for actual field uses. Shown in FIG. 4 are load bearing surfaces 18 in base 22 that engage and support outer surface 16 of segments 6. There are, in this example, four load bearing surfaces 18 arranged in an equidistant polar array relative to central axis 24 (see FIG. 7) in base 22 (see FIG. 6). The E-TCD 2 has its central axis 24 coincident with the axis of threaded rod 4. Left guide surface 17, load bearing surface 18 and right guide surface 19 are defined as a feature set. Also load bearing surface 18 is advantageously designed to be inclined approximately 30 degrees relative to central axis 24.

FIG. 4 also shows a spring groove 14. There is one spring groove 14, one upper guide surface 12 and one outer surface 16 for each segment 6. In this example, we show four posts 20 on base 22. The four posts 20 on base 22 are used to couple cap 8 and strain ring 25 to base 22. Also shown are antenna 15 and printed circuit board 23 sliced in half such that strain gauge 27 and connecting wires 29 are readily visible. Within the scope of the present invention, depending upon the shape of E-TCD 2 and the number of segments, more or fewer posts 20 may be used. Above base 22 is shown spring 10. In a fully assembled E-TCD 2 the antenna 15 and printed circuit board 23 typically reside in the cap 8. Strain gauge 27 is securely bonded to the inside surface 33 of strain ring 25. Wires 29 carry the strain gauge information to printed circuit board 23. The circuitry on printed circuit board 23 processes the information from the strain gauge and transmits the gauge information and a unique identification code via an RF signal from antenna 15, typically upon receipt of a transmit request, likewise received through antenna 15.

FIG. 5 is a perspective view of a typical E-TCD 2 with cap 8 removed exposing segments 6, spring 10, antenna 15, printed circuit board 23, wires 29, strain ring 25 and barbs 31. Also shown is base 22.

FIG. 6 is a top view of base 22. Shown in top view are left guide surfaces 17, load bearing surfaces 18, right guide surfaces 19 and base 22. Also, press fit surfaces 28 on posts 20 and outer hex surfaces 21 are shown.

FIG. 7 shows load bearing surfaces 18 at a 30 degree angle to central axis 24. Now referring back to FIG. 4, in an assembled configuration, outer surfaces 16 bear against load bearing surfaces 18 of base 22. During application of clockwise torque upon hex surfaces 21 of base 22 left guide surfaces 17 engage right side surfaces 11 of segments 6 and cause segments 6 to rotate clockwise (when viewed from above in the sense of FIG. 4) about threaded rod 4. Similarly, during application of counter-clockwise torque upon hex surfaces 21 of base 22, right guide surfaces 19 of base 22 engage left side surfaces 13 of segments 6 and cause segments 6 to rotate counter-clockwise about threaded rod 4. It should be noted that E-TCD 2 will operate correctly even if left guide surfaces 17 of base 22 and right guide surfaces 19 of base 22 do not engage right side surfaces 11 of segments 6, and left side surfaces 13 of segment 6 respectively, provided that load bearing surfaces 18 of base 22 are engaged with outer surfaces 16 of segments 6. It should also be noted that segments 6 engage the rod threads (as shown in FIG. 9).

FIG. 8 shows base 22, strain ring 25 and cap 8 sliced in half. This view specifically illustrates how cap 8 is attached in this example to base 22 using the barbs 31 on strain ring 25. During assembly of the E-TCD, strain ring 25 is press fit over base press fit surfaces 28. This operation expands the strain ring 25 and provides for a secure attachment of the strain ring to the base. Now to attach the cap 8 (advantageously made of plastic) it is pressed over strain ring barbs 31 that engage cap inner surface 35. If the cap 8 is attempted to be removed the barbs 31 dig into the inner surface 35 and provide a high retention force preventing cap removal.

FIG. 9 is a cross sectional view of E-TCD 2 as defined by Section 9-9 shown in FIG. 2 with segments 6 engaged with threaded rod 4 in accordance with some embodiments of the present invention. Also shown in cross section is cap 8, and base 22 along with spring 10. Also shown are motion direction arrow right 50 and motion direction arrow left 52 that define the direction of motion of segments 6 during ratcheting.

FIG. 10 is a perspective view of a typical movable segment 6. The threads of segment 6, 40, are chosen in this example to match the thread geometry of threaded rod 4 and therefore engage the threads of threaded rod 4. While the thread phase could be different among segments within an E-TCD 2 it is more economical if all the segments are identical.

FIG. 11 is an electrical block diagram graphically describing typical circuitry for handling electrical signal from the strain gauge to the A/D (analog to digital) converter to the RFID IC (integrated circuit) and then transmitted via the antenna to the reader where the signal is received and interpreted as the unique identifying code and strain value for the specific E-TCD 2.

Typical E-TCDs described herein are capable of two fundamental functions. One is the mechanical function and the other is the electrical function. To understand the mechanical function we refer to FIG. 1 and describe a typical example of mechanical function. This exemplary E-TCD 2 is typically configured to move along threaded rod 4 in one direction ("ratcheting direction") without rotation of E-TCD 2, and to not move in the opposite direction ("locking direction") without rotation. (For the purposes of describing E-TCD 2 and related embodiments, the direction of motion whereby E-TCD 2 moves along threaded rod 4 without rotation shall be defined as the ratcheting direction and the opposite direction of motion as the non-ratcheting or locking direction.) In particular, in accordance with some embodiments of the present invention, E-TCD 2 is typically configured to be engaged to threaded rod 4 such that a single downward hand movement of E-TCD 2 down the length of threaded rod 4 will correspondingly move E-TCD 2 in the ratcheting direction, generally to a predetermined position on threaded rod 4. Once in place, an upward hand movement of E-TCD 2 along the length of threaded rod 4 will be met with an equal and opposite force such that E-TCD 2 will not move in the non-ratcheting direction. Rather, in order to move E-TCD 2 in the upward non-ratcheting direction of threaded rod 4, E-TCD 2 is rotated along the threads of threaded rod 4. The most common configuration with respect to E-TCD 2 engaged to a vertical threaded rod 4 is where (when viewed from above) a counter-clockwise rotation of E-TCD 2 will advance E-TCD 2 upward (non-ratcheting direction) with respect to threaded rod 4.

It should be noted that while the above description is provided with respect to upward (non-ratcheting) and downward (ratcheting) hand movements of E-TCD 2 along the length of threaded rod 4, the direction of the movements of E-TCD 2 may be arbitrary depending upon, for example, the position of threaded rod 4 to which E-TCD 2 is engaged.

In some embodiments, E-TCD 2 will ratchet whenever E-TCD 2 is moved along threaded rod 4 a minimum of one half (½) of a thread pitch in the ratcheting direction. That is, when E-TCD 2 moves one half of a thread pitch the segment set that matches the rod thread will ratchet such that if forces try to move the segment set in the opposite non-ratcheting direction, a minimum of one segment will lock up and prevent motion in the opposite direction with respect to threaded rod 4. To implement ½ thread ratcheting 2 identical segments 6 are arranged opposite one another in two of the possible positions (shown in FIG. 7).

In particular, with respect to FIG. 7 and FIG. 9, each of the two segments are driven upwards and outward at a 30 degree angle relative to central axis 24 as a result of upper guide surface 12 (FIG. 9 shows guide surface 30 engaging bearing upper guide surface 12) engaging cap guide surface 30 as threaded rod 4 (or equivalently the E-TCD 2) is pushed in the ratcheting direction. In this case, with sufficient movement of the segments along motion direction arrow right 50 and motion direction arrow left 52 (FIG. 9) segments 6 will completely disengage from the threads of threaded rod 4, and re-engage when the next rod thread moves into position to allow the two segments 6 to move toward the central axis of threaded rod 4 and re-engage the threads of threaded rod 4.

On the other hand, if the forces reverse in direction and threaded rod 4 is driven down in the non-ratcheting direction (or E-TCD 2 is driven up), segments will be driven toward threaded rod 4 and lock. The threads will stay engaged as long as the downward force exists because of the inward radial force pushing segments 6 toward threaded rod 4. The inward radial force is generated by (see FIGS. 4, 5 and 6) load bearing surfaces 18 of base 22 contacting outer surfaces 16 of segments 6. Also to be considered is the outward radial force caused by the interaction of thread flanks of threaded rod 4 against top thread flank 42 of segment 6 (FIG. 11). The inward radial force relative to axis 24 on segment 6 overcomes the outward radial force on segment 6 as long as the "flank angle", the included angle between top thread flank 42 of segment 6 and the bottom thread flank 44 (FIG. 10) remains approximately 60 degrees which is the standard flank angle for American Standard and Metric threads, and the angle of load bearing surface 18, remains substantially 30 degrees relative to axis 24, and the reversing forces (forces in the non-ratcheting direction) are present. The resultant inward force keeps the segments 6 engaged with threaded rod 4.

Moreover, in some embodiments of the present invention, the material used to construct segments 6 is chosen to have a yield point greater than or equal to that of the material used for fabrication of threaded rod 4. Even when the yield points are substantially similar between the materials for threaded rod 4 and segments 6, and one segment 6 begins plastic deformation, as soon as threaded rod 4 moves (that is, before all segments of the segment set are fully engaged and resisting the motion of the threaded rod), other segments 6 will start to engage threaded rod 4 to overcome the strength of threaded rod 4. Actual experiments have shown that upon application of an increasing load on threaded rod 4 while engaged with segments 6, segments 6 will crush the threaded rod 4 and the threaded rod 4 will fail by separating in two, typically at a point just below the segments 6. That is, if the system is placed under increasing axial force in the non-ratcheting direction) between the rod and the E-TCD 2 until failure occurs, the rod rather than the E-TCD 2 is the element most likely to fail. The segments 6 are typically much stronger and transfer more load per thread 40 to the threaded rod 4 than a standard hex nut with the same number of threads and of the same thread geometry because the E-TCD 2 provides inward radial forces that place the segment 6 threads 40 material in compression and not just in shear as is the case with a standard hex nut having thread elements incapable of moving radially toward the threaded rod.

Alternatively, the material for segments 6, may have a yield point substantially lower than that for threaded rod 4, in which case threaded rod 4 will still fail (i.e., give way or break off) before E-TCD 2 is compromised if there is sufficient length of thread engagement.

Moreover, spring 10 in some embodiments is configured to have sufficient tension to cause segments 6 to close around threaded rod 4 even in the case where there is gravitational force pulling segments 6 away from threaded rod 4 (for example, in the case where E-TCD 2 is inverted). Indeed, if segments 6 are not driven toward the central axis of threaded rod 4 by spring force, segments 6, may move outward to the wall of cap 8 wall and remain in that position resulting in E-TCD 2 not engaging with threaded rod 4.

Referring to the FIG. 9, the motion direction arrow right 50 and motion direction arrow left 52 illustrate the line of action in which segments 6 are configured to move when E-TCD 2 moves in the ratcheting direction with respect to threaded rod 4.

During final assembly of these embodiments, the strain ring 25 is pushed down over posts 20 to be press fit against press fit surface 28 of base 22 (FIG. 8). Once the strain ring is in place, cap 8 is aligned over the strain ring 25 and during assembly the cap inner surface 35 engages barbs 31 on strain ring 25 as the cap is pushed down over the strain ring. The cap 8 now cannot be removed from the base 22 without damage to the cap 8. This accomplishes the final assembly of the E-TCD 2 without the use of fasteners.

While the absence of fasteners in the assembly of E-TCD is likely to be advantageous in practice, some embodiments of the present invention may employ fasteners as would be apparent to those having ordinary skill in the art.

Referring to FIG. 7 a conical lead-in 26 is conveniently used to guide the E-TCD 2 over the end of threaded rod 4 upon initial engagement of E-TCD 2 to the end of threaded rod 4. The lead-in 26 causes installation of E-TCD 2 over the end of threaded rod 4 to be quick and easy as the lead-in 26 guides the end of threaded rod 4 to the center of E-TCD 2. The segments 6 then move according to FIG. 9 as previously described as segments 6 engage the end of threaded rod 4.

To measure the tension load on the E-TCD 2 (equivalent to the tension load in the threaded rod 4 to which the E-TCD 2 is engaged), it is required to measure some mechanical parameter that is proportional to load. Unlike many thread fasteners, this is feasible to do in an E-TCD 2 as generally described herein because of its advantageous construction. The E-TCD 2 uses moving segments 6 to engage the threads of threaded rod 4. The process of thread engagement previously described causes the segments to be forcibly driven radially into the rod. Now referring to FIG. 4, there also exists a force equal and opposite to this radial force that is exerted outwardly against the base 22, load bearing surfaces 18 by outer surfaces 16. The forces against load bearing surfaces 18 cause the base to expand radially outward. In turn, this causes strain ring 25 to expand since the strain ring 25 inside surface 33 wraps around base 22 posts 20 and is fitted against press fit surface 28.

Again referring to FIG. 4 strain gauge 27 is bonded to inside surface 33 and as inside surface 33 expands or contracts so does the gauge 27 that is bonded to inside surface 33. The expansion and contraction of strain ring 25 is proportional to the axial load on threaded rod 4. The strain gauge 27 is intimately bonded to strain ring 25 and therefore also expands and contracts in proportion to the axial load on threaded rod 4.

The strain gauge electrical signal is passed to printed circuit board 23 via wires 29. The gauge signal is processed by the electrical circuit (FIG. 12) on printed circuit board 23. When commanded by an external electrical RF signal received by antenna 15 the electrical circuit on printed circuit board 23 generates and transmits a signal via antenna 15. The electrical power to run the printed circuit board circuitry may be derived from the original incoming signal or may be provided by a local power source such as a battery.

In a typical embodiment of the invention, the electrical signals are taken to comply with standardized RFID protocols. The returned signal from printed circuit board 23 contains a unique code identifying the specific E-TCD 2, and also embedded in the return signal is the value of strain provided by the strain gauge 27. Signals from the strain gauge 27 do not have to be proportional to the load on threaded rod 4 they only have to be repeatable. In other words the same load on threaded rod 4 should produce the same electrical value from gauge 27. Each E-TCD 2 is calibrated at the factory. The results of the factory calibration are compiled in a "look up table" and then stored in computer memory and the "look up table" is associated in the computer with the unique identification code of the E-TCD 2. This memory may physically reside on printed circuit board 23 or reside in any data memory location that is accessible by the computer processor associated with the RFID reader that is interrogating the E-TCD 2. The look up table provides an actual tensile load value for any electrical value provided by gauge 27 of the specific E-TCD 2.

Printed circuit board 23 and antenna 15 are referred to as an RFID tag if the RF protocols being used are consistent with the RFID protocol defined by ISO standards. The E-TCD 2 embodiment shown in FIG. 4 represents a class 2 passive or class 3 semi passive RFID tag although the power source defined in a class 3 tag such as a battery is not shown in FIG. 4. Passive class 2 tags require no power, but have a much shorter read range than the class 3 semi passive tags that have a power source allowing higher power transmissions and thus longer transmission distances between the E-TCD 2 and the reader (interrogator).

Another advantage and capability of the E-TCD 2 is that a standard RFID reader (interrogator) may be combined with current cell phone technology. This combination is defined as a Cell-Monitoring Station (CMS) which will allow the user to command a computer to communicate with a specific group of remote E-TCD 2's and request the current tensile load of each E-TCD 2 within antenna range of the CMS. The CMS may be commanded to report the current or past tensile load and identification code of each of the E-TCD 2's within the group. Other advantages include the ability of the CMS to be programmed to call a specific computer and report any condition to which the CMS is programmed to respond. This provides to the user the ability to monitor the security of any device within the CMS network to be sure it is secured or fastened as intended and any abnormalities within the fastening system of E-TCD 2's will be reported.

What is claimed is:

1. A thread clamping device comprising:
   a) a top housing and an end housing surrounding a plurality of movable nut segments wherein each of said nut segments has a threaded inner surface suited for engaging a threaded rod; and,
   b) a plurality of base posts as part of said end housing in mechanical communication with said movable nut segments such that movement of said movable nut segments when fully engaged with said threaded rod causes movement of said base posts with respect to said threaded rod; and,
   c) a strain ring tightly surrounding said plurality of base posts; and,
   d) a strain gauge tightly joined to said strain ring suitable for measuring the load on said strain ring resulting from the movement of said fully engaged movable nut segments transmitted through said base posts and said strain ring; and,
   e) an antenna connected to said strain gauge through electronic circuits wherein said circuits enable said antenna to receive an inquiry signal from an external transmitter, receive and record the strain measured by said strain gauge and transmit said strain through said antenna to an external receiver.

2. A thread clamping device as in claim 1 wherein said movable nut segments have two or more different thread structures suited for engaging threaded rods having different thread structures.

3. A thread clamping device as in claim 1 having four movable nut segments.

4. A thread clamping device as in claim 1 wherein said movable nut segments are identical.

* * * * *